(12) United States Patent
Sakamaki et al.

(10) Patent No.: US 9,104,820 B2
(45) Date of Patent: *Aug. 11, 2015

(54) SEMICONDUCTOR DEVICE AND DATA PROCESSING SYSTEM SELECTIVELY OPERATING AS ONE OF A BIG ENDIAN OR LITTLE ENDIAN SYSTEM

(71) Applicant: Renesas Electronics Corporation, Kawasaki-shi, Kanagawa (JP)

(72) Inventors: Goro Sakamaki, Tokyo (JP); Yuri Azuma, Tokyo (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/628,059

(22) Filed: Feb. 20, 2015

(65) Prior Publication Data

US 2015/0161071 A1 Jun. 11, 2015

Related U.S. Application Data

(63) Continuation of application No. 14/198,414, filed on Mar. 5, 2014, now Pat. No. 8,966,227, which is a continuation of application No. 13/922,232, filed on Jun. 19, 2013, now Pat. No. 8,700,885, which is a (Continued)

(30) Foreign Application Priority Data

Jun. 1, 2005 (JP) .................................. 2005-160901

(51) Int. Cl.
*G06F 9/30* (2006.01)
*G06F 13/42* (2006.01)
(Continued)

(52) U.S. Cl.
CPC ............ *G06F 13/4221* (2013.01); *G06F 7/768* (2013.01); *G06F 13/10* (2013.01); *G06F 13/102* (2013.01); *G06F 13/20* (2013.01); *G06F 13/4013* (2013.01)

(58) Field of Classification Search
None
See application file for complete search history.

(56) References Cited

U.S. PATENT DOCUMENTS 5,107,415 A 4/1992 Sato et al.
5,446,482 A 8/1995 Van Aken et al.
(Continued)

FOREIGN PATENT DOCUMENTS

| JP | 08-305628 | 11/1996 |
|---|---|---|
| JP | 2003309576 A | 10/2003 |
| KR | 2003050462 A | 6/2003 |

OTHER PUBLICATIONS

'Keystone Architecture Peripheral Component Interconnect Express (PCIe) User Guide' by Texas Instruments, Sep. 2013.*

(Continued)

*Primary Examiner* — Steven Snyder
(74) *Attorney, Agent, or Firm* — Miles & Stockbridge P.C.

(57) ABSTRACT

The present invention is to provide a semiconductor device that can correctly switch endians on the outside even if the endian of a parallel interface is not recognized on the outside. The semiconductor device includes a switching circuit and a first register. The switching circuit switches between whether a parallel interface with the outside is to be used as a big endian or a little endian. A first register holds control data of the switching circuit. The switching circuit regards the parallel interface as the little endian when first predetermined control information, that is unchanged in the values of specific bit positions even if its high-order and low-order bit positions are transposed, is supplied to the first register, and regards the parallel interface as the big endian when second predetermined control information, that is unchanged in the values of specific bit positions even if its high-order and low-order bit positions are transposed, is supplied to the first register. Whatever the endian setting status, the control information can be correctly inputted without being influenced by the endian setting status.

12 Claims, 8 Drawing Sheets

Related U.S. Application Data continuation of application No. 13/662,516, filed on Oct. 28, 2012, now Pat. No. 8,504,801, which is a continuation of application No. 13/327,757, filed on Dec. 16, 2011, now Pat. No. 8,316,217, which is a continuation of application No. 13/038,237, filed on Mar. 1, 2011, now Pat. No. 8,095,776, which is a continuation of application No. 12/708,805, filed on Feb. 19, 2010, now Pat. No. 7,934,077, which is a continuation of application No. 11/443,126, filed on May 31, 2006, now Pat. No. 7,685,407.

(51) Int. Cl.
*G06F 13/20* (2006.01)
*G06F 13/40* (2006.01)
*G06F 7/76* (2006.01)
*G06F 13/10* (2006.01)

(56) References Cited

U.S. PATENT DOCUMENTS

| | | |
|---|---|---|
| 5,627,975 A | 5/1997 | Bryant et al. |
| 5,687,337 A | 11/1997 | Carnevale et al. |
| 5,778,406 A | 7/1998 | Willard |
| 5,828,884 A | 10/1998 | Lee et al. |
| 5,857,083 A | 1/1999 | Venkat |
| 5,867,690 A | 2/1999 | Lee et al. |
| 5,903,779 A | 5/1999 | Park |
| 5,928,349 A | 7/1999 | Loen et al. |
| 5,961,640 A | 10/1999 | Chambers et al. |
| 5,968,164 A | 10/1999 | Loen et al. |
| 5,970,236 A * | 10/1999 | Galloway et al. ............ 712/300 |
| 6,330,626 B1 | 12/2001 | Dennin et al. |
| 6,341,345 B1 | 1/2002 | Auslander et al. |
| 6,388,586 B1 | 5/2002 | Fischer et al. |
| 6,424,347 B1 | 7/2002 | Kwon |
| 6,687,262 B1 | 2/2004 | Jin et al. |
| 7,139,905 B2 | 11/2006 | Filer et al. |
| 7,181,562 B1 | 2/2007 | Stenfort et al. |
| 7,334,066 B2 | 2/2008 | Lee |
| 7,577,777 B2 | 8/2009 | Lee |
| 7,587,535 B2 | 9/2009 | Sawai |
| 7,587,557 B2 | 9/2009 | Funahashi et al. |
| 7,685,407 B2 | 3/2010 | Sakamaki et al. |
| 7,721,077 B2 | 5/2010 | Rajaram |
| 7,822,955 B2 | 10/2010 | Flynn et al. |
| 7,870,316 B1 | 1/2011 | Peacock et al. |
| 2001/0038348 A1 | 11/2001 | Suzuki et al. |
| 2003/0064747 A1 | 4/2003 | Simmons et al. |
| 2004/0059848 A1 | 3/2004 | Chang et al. |
| 2005/0198483 A1 | 9/2005 | Park et al. |
| 2006/0224809 A1 | 10/2006 | Gelke et al. |
| 2010/0138635 A1 | 6/2010 | Noyes |
| 2011/0191569 A1 | 8/2011 | Ishikawa et al. |
| 2012/0173924 A1 | 7/2012 | Xiao et al. |

OTHER PUBLICATIONS

'Linux/m68k ext2fs byteswapping mini-HOWTO' by Michael Schmitz, posted at http://www.linux-m68k.org/ext2swap.html, Feb. 6, 1997.
'Endianness White Paper' by Intel, Nov. 15, 2004.
'Write Great Code' by Randall Hyde, copyright 2004, pp. 144-149.
Office Action issued Nov. 15, 2012, in Taiwan Patent Application No. 095116817.

* cited by examiner

FIG. 5

SWITCHING CIRCUIT OPERATION

| TCREV | HIGH-ORDER DATA FETCH PULSE | LOW-ORDER DATA FETCH PULSE |
|---|---|---|
| 0 (BIG ENDIAN) | FIRST TRANSFER PULSE | SECOND TRANSFER PULSE |
| 1 (LITTLE ENDIAN) | SECOND TRANSFER PULSE | FIRST TRANSFER PULSE |

FIG. 6

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| CMDAS | 0 | 0 | 0 | 0 | 0 | 1 | 1 | 0 | 0 | 0 | 0 | 0 | 0 | 1 | 1 | 0 |
| CMDDL (TV=1) CMDDB (TV=0) | 0 | 0 | 0 | 0 | 0 | 0 | 0 | TV | 0 | 0 | 0 | 0 | 0 | 0 | 0 | TV |

SEMICONDUCTOR DEVICE AND DATA PROCESSING SYSTEM SELECTIVELY OPERATING AS ONE OF A BIG ENDIAN OR LITTLE ENDIAN SYSTEM

CROSS-REFERENCE TO RELATED APPLICATION

The present application claims priority from Japanese patent application No. 2005-160901 filed on Jun. 1, 2005, the content of which is hereby incorporated by reference into this application.

BACKGROUND OF THE INVENTION

The present invention relates to a technology for switching between whether a parallel interface is to be used as a big endian or a little endian. More particularly, the present invention relates to a semiconductor device used as a peripheral device such as a transfer slave, and a data processing system which includes a host device such as a transfer master, and a peripheral device such as a transfer slave.

In the case where a parallel interface is performed between a host device and a peripheral device (that is, between a transfer master and a transfer slave, or between a bus master and a bus slave), when the transfer unit of data to be transferred exceeds the number of parallel bits (bus width) of a data bus, the data must be transferred in a plurality of batches. Transfer modes in this case include a big endian and a little endian. In a big endian mode, high-order bytes and low-order bytes of the data are transferred in that order. In a little endian mode, low-order bytes and high-order bytes of the data are transferred in that order. Therefore, the transfer modes must match between the host device and the peripheral device. If the host device transfers data in the big endian mode and the peripheral device receives it in the little endian mode, high-order bytes and low-order bytes of the data received by the peripheral device would be reversed with the data transferred by the host device.

Conventionally, semiconductor devices such as peripheral devices have enabled switching between a big endian and a little endian by pull-up or pull-down of external terminals. However, this would require an extra mode terminal for endian switching.

A technology for automatic switching of endians is disclosed in Patent Document 1. According to it, an endian conversion information part that holds an address value to be subjected to endian switching, and a determination part that automatically determines whether to perform endian switching by comparing address values are provided to enable automatic execution of endian switching.

Japanese Unexamined Patent Publication No. Hei 8 (1996)-305628

SUMMARY OF THE INVENTION

However, also in the technology for automatic switching of endians, as a precondition, host devices such as a transfer master and a bus master must recognize in advance the endians of peripheral devices such as a transfer slave and a bus slave. Otherwise, information itself for endian switching cannot be correctly received in the peripheral devices. Accordingly, there occur cases where the host devices must perform a transfer operation in line with the endians of the peripheral devices. This means that the peripheral devices stipulate the operation of the host devices, burdening system design.

An object of the present invention is to provide a semiconductor device that can correctly switch endians on the outside even if the endian of a parallel interface is not recognized on the outside.

Another object of the present invention is to provide a data processing system that can match the endian of a peripheral device to the endian of a host device even if the host device does not recognize the endian of the peripheral device.

The above-mentioned objects and other objects and novel characteristics of the present invention will become apparent from the description of this specification and the accompanying drawings.

Typical inventions disclosed in the present application will be briefly described below.

[1] A semiconductor device 1 relating to the present invention includes a switching circuit 36 and a first register 10. The switching circuit switches between whether a parallel interface with the outside is to be used as a big endian or a little endian. A first register holds control data (CMDDL, CMDDB) of the switching circuit. The switching circuit regards the parallel interface as the little endian when first predetermined control information (CMDDL), that is unchanged in the values of specific bit positions even if its high-order and low-order bit positions are transposed, is supplied to the first register. In contrast to this, the switching circuit regards the parallel interface as the big endian when second predetermined control information (CMDDB), that is unchanged in the values of specific bit positions even if its high-order and low-order bit positions are transposed, is supplied to the first register. Thereby, whatever the endian setting status of the semiconductor device, the control information can be correctly received without being influenced by the endian setting status. Therefore, even if the endian of the parallel interface is not recognized on the outside, the endian can be correctly switched on the outside.

As one concrete configuration of the present invention, the semiconductor device includes a selecting circuit 12 for selecting the first register. When predetermined selection information (CMDAS), that is unchanged in the values of specific bit positions even if its high-order and low-order bit positions are transposed, is supplied, the selecting circuit selects the first register to enable the input of the control data. Like the control information, the selection information can also be correctly received without being influenced by the endian setting status.

As a further concrete configuration of the present invention, the semiconductor device includes a second register 35 for holding the selection information. When predetermined selection information, that is unchanged in the values of specific bit positions even if its high-order and low-order bit positions are transposed, is supplied to the second register, the selecting circuit selects the first register.

As a further concrete configuration of the present invention, information, that is unchanged in the values of specific bit positions even if its high-order and low-order bit positions are transposed, is information the values of high-order bits and low-order bits of which match each other. In the case of 16-bit data, selection information is h0606, first control information is h0101, and second control information is h0000. The symbol h denotes that following digits are hexadecimal.

As a further concrete configuration of the present invention, the semiconductor device includes a plurality of external terminals (DB7-0) used for the parallel interface with the selection information and the control data. The selection information and the control data are inputted in series using predetermined packets from the external terminals.

[2] The semiconductor device according to another aspect includes a first register 10, a second register 35, a selecting circuit 12, and a switching circuit 36. The first register holds control data for controlling whether a parallel interface with the outside is to be used as a big endian or a little endian. The second register holds selection information (CMDAS) for selecting the control register. The selecting circuit selects the first register when predetermined selection information the values of high-order bits and low-order bits of which match each other is supplied to the second register. The switching circuit regards the parallel interface as the little endian when first predetermined selection information (CMDDL) the values of high-order bits and low-order bits of which match each other is supplied to the first register selected by the selecting circuit. In contrast to this, the switching circuit regards the parallel interface as the big endian when second predetermined selection information (CMDDB) the values of high-order bits and low-order bits of which match each other is supplied to the first register selected by the selecting circuit.

Thereby, whatever the endian setting status of the semiconductor device, the control information and the selection information can be correctly received without being influenced by the endian setting status. Therefore, even if the endian of the parallel interface is not recognized on the outside, the endian can be correctly switched on the outside.

As one concrete configuration of the present invention, the semiconductor device includes a plurality of external terminals (DB7-0) used for the parallel interface with the selection information and the control data. The selection information and the control data are inputted in series using predetermined packets from the external terminals.

As a further concrete configuration of the present invention, the selection information is first command address information given from the outside. The first control information is a first command given from the outside along with the first command address information. The second control information is a second command given from the outside along with the first command address information.

As a further concrete configuration of the present invention, the semiconductor device includes a data processing part that performs data processing according to a third command given from the outside along with the second command address information.

The data processing part includes a display memory 14 and driving circuits 20 and 25 for driving display electrodes of a display on the basis of display data stored in the display memory. Such a semiconductor device is a liquid crystal driving control device that is formed on one semiconductor substrate and controls the display and driving of a liquid crystal display.

[3] A data processing system according to the present invention includes host devices 30 and 45, and a peripheral device 1 connected to the host devices via a plurality of signal lines. The peripheral device includes a first register that holds control data for controlling whether a parallel interface by the plurality of signals is to be used as a big endian or a little endian, and a second register that holds selection information for selecting the control register. When selecting the first register, the host devices output selection information the values of high-order bits and low-order bits of which match each other to the second register. Furthermore, when regarding the parallel interface of the peripheral device as the little endian, the host devices output first predetermined information the values of high-order bits and low-order bits of which match each other to the selected first register. Thereby, the host device can match the endian of the peripheral device to its own endian even when not recognizing the endian of the peripheral device.

In another data processing system according to the present invention, when regarding the parallel interface of the peripheral device as the big endian, the host devices output second predetermined control information the values of high-order bits and low-order bits of which match each other to the selected first register. Also in this case, the host device can match the endian of the peripheral device to its own endian even when not recognizing the endian of the peripheral device.

As one concrete configuration of the data processing system, the selection information is first command address information outputted by the host devices. The first control information is a first command outputted by the host devices along with the first command address information. The second control information is a second command outputted by the host devices along with the first command address information.

As a further concrete configuration, the peripheral device includes a data processing part that performs data processing according to a third command outputted by the host devices along with the second command address information.

As a further concrete configuration, when the data processing system includes a display connected to the peripheral device, the data processing part includes a display memory, and a driving circuit that drives display electrodes of the display on the basis of display data stored in the display memory.

As a further concrete configuration, the host devices include a microcomputer 45B that controls the peripheral device.

As a further concrete configuration, when the data processing system includes a high-frequency part connected to the host devices, the host devices include a microcomputer 45A that performs baseband processing of cellular phones.

Effects obtained by typical inventions disclosed in the present application will be briefly described below.

According to the semiconductor device, even if the endian of the parameter interface is not recognized on the outside, endian switching can be correctly performed on the outside.

According to the data processing system, even if the host devices do not recognize the endian of the peripheral device, the endian of the peripheral device can be matched to their own endian.

BRIEF DESCRIPTION OF THE DRAWINGS

FIG. 5 is a drawing concisely showing an operation mode of a switching circuit in an endian setting circuit;

FIG. 6 is a drawing illustrating command address information CMDAS for selecting an endian setting register, a first endian setting command CMDDL, and a second endian setting command CMDDB.

DESCRIPTION OF THE PREFERRED EMBODIMENTS

Liquid Crystal Driving Control Device

Figure 2:
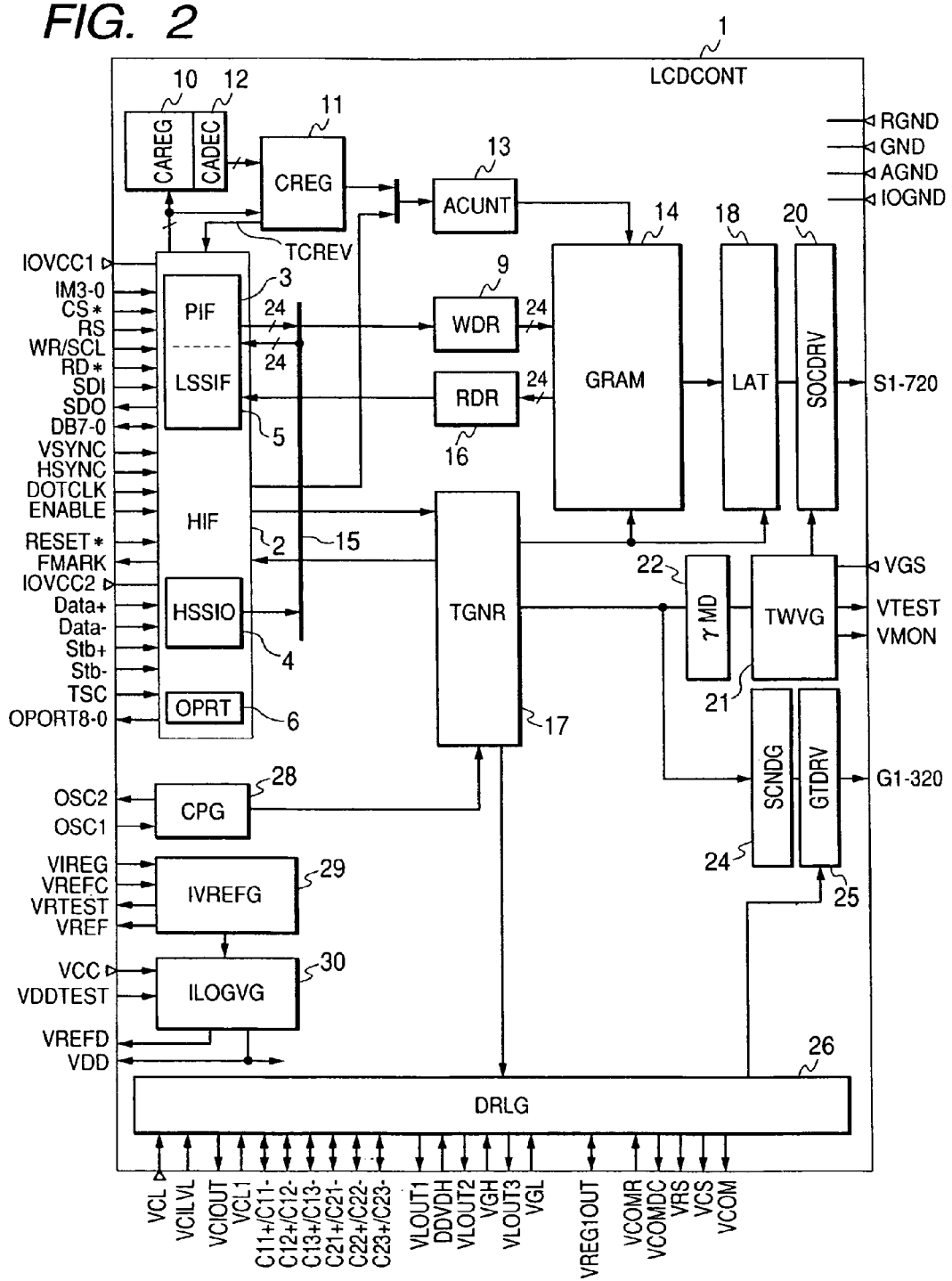
FIG. 2 is a block diagram showing the construction of a liquid crystal driving control device according to a semiconductor device.

FIG. 2 shows the construction of a liquid crystal driving control device (LCDCNT) 1 as an example of semiconductor device. A host interface circuit (HIF) 2 includes a parallel interface circuit (PIF) 3, a high-speed serial interface circuit (HSSIO) 4, a low-speed serial interface circuit (LSSIO) 5, and an output port (OPRT) 6. The parallel interface circuit (PIF) 3 inputs and outputs information via a parallel bus DB0-7, for example, in units of eight bits in parallel. The low-speed serial interface circuit 5 serially inputs and outputs data using a serial input terminal SDI and a serial output terminal SDO. The high-speed serial interface circuit 4 rapidly inputs and outputs serial data with amplitude differential using differential data terminals data± and differential strobe terminals stb±. The output port 6 can control logical levels of output signals of a port terminal OPORT8-0. A chip select signal CS and a write signal WR are typical strobe signals for a parallel interface. The host interface circuit (HIF) 2, to input and output commands and display data to and from a host device (not shown) connected to it, can use the parallel interface circuit 3, the high-speed serial interface circuit 4, or the low-speed serial interface circuit 5. Which of them is to be used depends on a pull-up or pull-down state of a mode terminal IM3-0.

The host device transfers commands and data to the host interface circuit 2 using a packet of a predetermined format. Although not shown in the drawing, the packet consists of a header part and a body part. The header part includes an address area as well as a data word length of the packet and type information of the packet. The address area holds address information about registers and a memory in the liquid crystal driving control device 1. Data corresponding to the address information and a command are held in a data area of the body part.

When the parallel interface circuit 3 is employed for an interface with the host device, the address information, command, and data are received from a data input-output terminal DB0-7 via the packet.

On receiving a command packet from the host device, the host interface circuit 2 stores the address information in a command address register (CAREG) 10. A command address decoder (CADEC) 12 decodes a command address stored in the command address register 10 to generate a register select signal and the like. Command data received by the packet is supplied to a command data register array (CORED) 11. The command data register array 11 has numerous command data registers mapped into predetermined addresses, respectively. A command data register to store the received command is selected by the register select signal outputted from the command address decoder 12. The command data latched into the command data register is supplied to a corresponding circuit portion as an instruction or control data, and controls internal operations. The command data register array 11 may be directly selected by the register select signal RS to set the command data in the command data register.

On receiving a data packet from the host device, the host interface circuit 2 supplies the address information to an address counter 13. The address counter 13 performs an increment operation and the like according to the contents of the corresponding command data register to perform addressing for a display memory (GRAM) 14. If an access indication by the command data is a write operation on the display memory 14, data of the data packet is supplied to a write data register (WDR) 9 via a bus 15, and stored in the display memory (GRAM) 14 in an appropriate timing. Display data is stored in units of display frames. If an access indication by the command data is a read operation on the display memory 14, data stored in the display memory is read into a read data register (RDR) 16 and becomes ready to be supplied to the host device. When the command data register receives a display command, a read operation synchronous with a display timing is performed for the display memory 14. Timing control of reading and displaying is performed by a timing generator (TGNR) 17. Display data read from the display memory 14 synchronously with the display timing is latched into a latch circuit (LAT) 18. The latched data is given to a source driver (SOCDRV) 20. A liquid crystal display subject to driving control by the liquid crystal driving control device 1 is constructed by a TFT (Thin Film Transistor) liquid crystal panel of dot matrix type, and includes driving terminals with numerous source electrodes as signal electrodes and numerous gate electrodes as scanning electrodes. The source driver (SOCDRV) 20 drives the source electrodes of the liquid crystal display by a driving terminal S1-720. A driving level of the driving terminal S1-720 is determined using a gradation voltage generated in a gradation voltage generating circuit (TWVG) 21. The gradation voltage is subjected to gamma correction in a gamma correction circuit (γMD) 22. A scan data generating circuit (SCNDG) 24 generates scanning data synchronously with scanning timing from the timing generator 17. The scanning data is supplied to a gate driver (GTDRV) 25. The gate driver 25 drives the gate electrodes of the liquid crystal display by a driving terminal G1-320. A driving level of the driving terminal G1-320 is determined using a driving voltage generated in a liquid crystal driving level generating circuit (DRLG) 26.

A clock pulse generator (CPG) 28 inputs a source oscillation clock from terminals OSC1 and OSC2 to generate an internal clock, and supplies it to the timing generator 17 as an operation timing reference clock. An internal reference voltage generating circuit (IVREFG) 29 generates a reference voltage and supplies it to an internal logic power regulator (ILOGVG) 30. The internal logic power regulator 30 generates an internal logic power on the basis of the reference voltage.

<Endian Setting Circuit>

Figure 3:
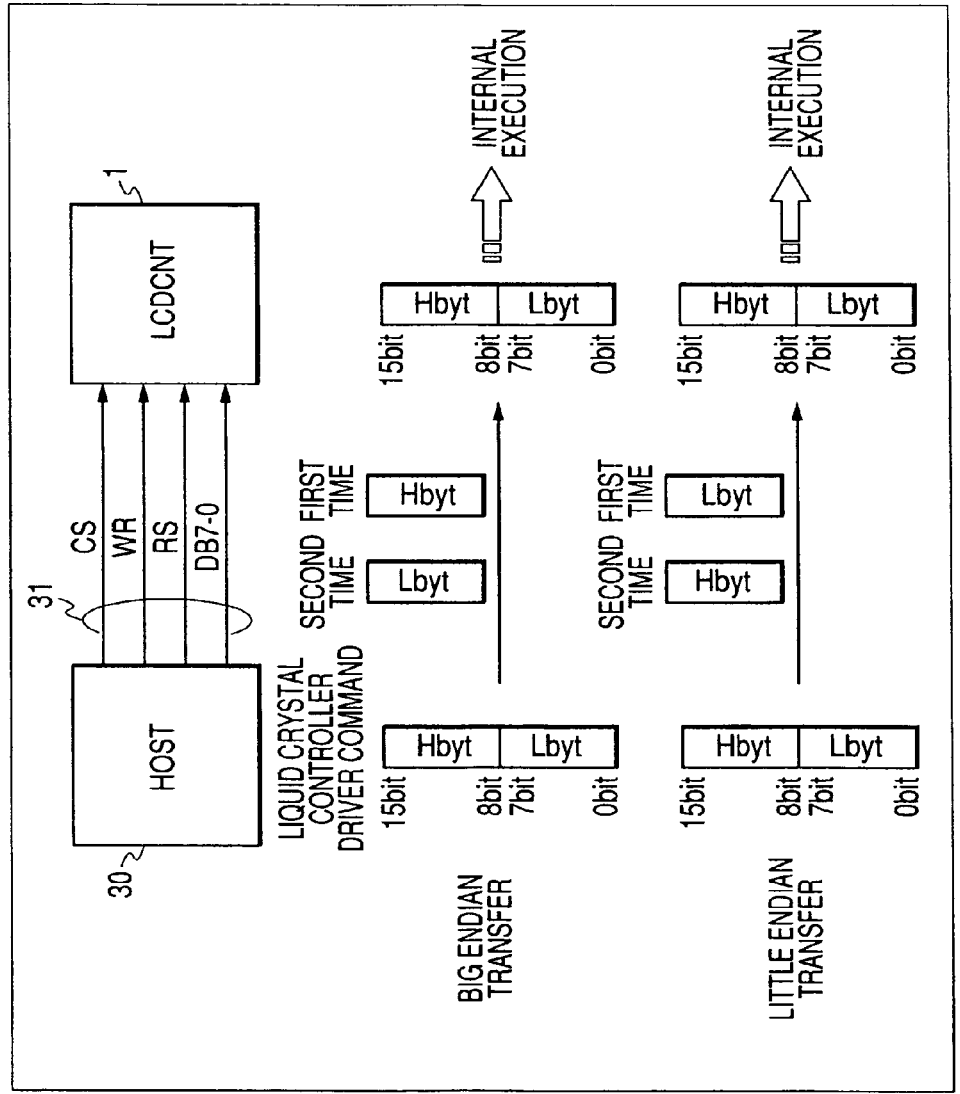
FIG. 3 is a drawing for explaining signal lines for a parallel interface in a liquid crystal driving control device.

FIG. 3 shows signal lines for a parallel interface in the liquid crystal driving control device. Signal lines 31 for connecting the liquid crystal driving control device 1 and a host device 30 are signal lines for a chip select signal CS, a write signal WR, a register select signal RS, and a data terminal DB7-0. The liquid crystal driving control device 1 can select whether the parallel interface is to be used as a big endian or little endian. As shown in FIG. 3, the big endian is a mode in which high-order bytes (Hbyt) and low-order bytes (Lbyt) of data are transferred in that order. The little endian is a mode in which low-order bytes and high-order bytes of data are transferred in that order. The endian must be the same between a transfer master and a transfer slave.

Figure 1:
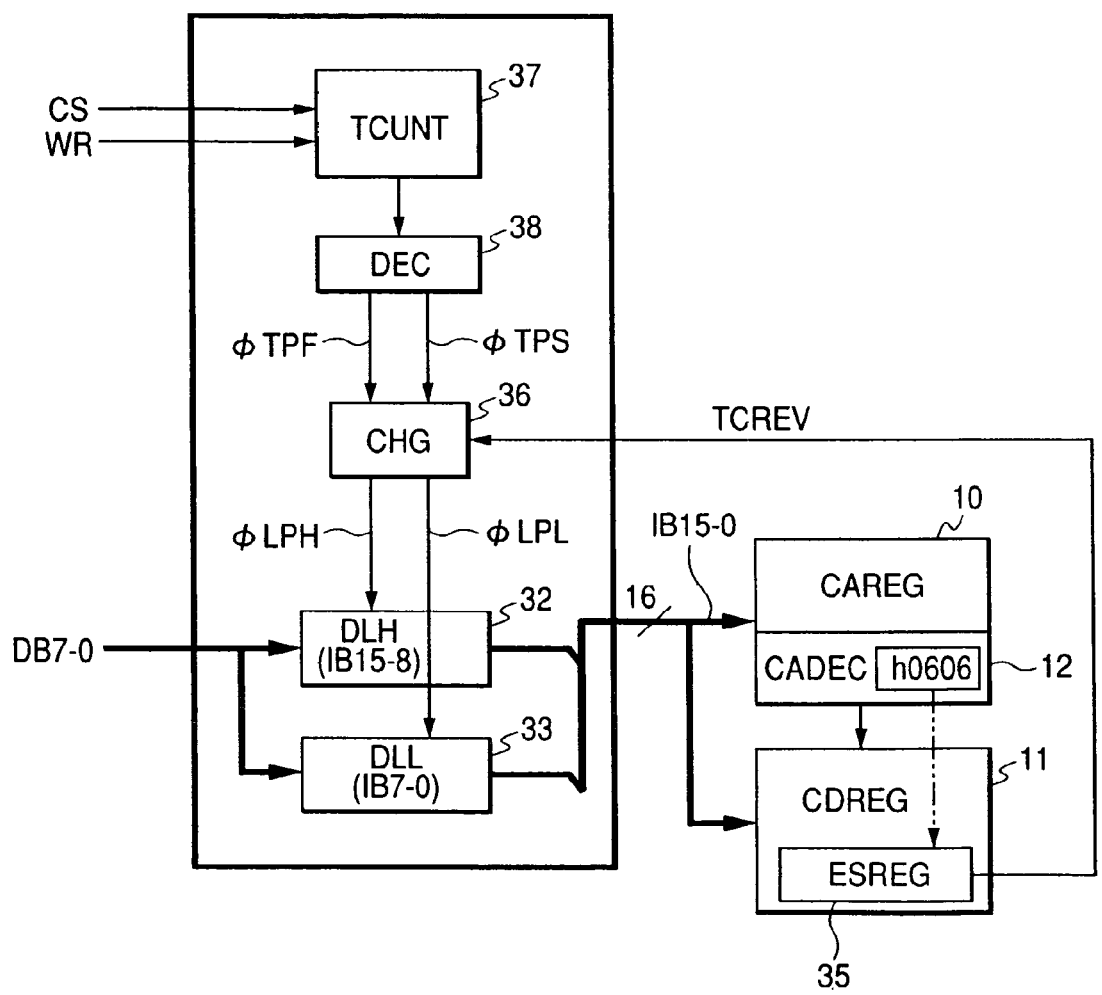
FIG. 1 is a block diagram showing an example of an endian setting circuit in a parallel interface circuit.

FIG. 1 shows an example of an endian setting circuit in a parallel interface circuit. An address area of a command packet has 16 bits, and a data area following the address area has 16 bits. Since the parallel data input terminal DB7-0 has eight bits, a 16-bit command address in the address area is inputted twice, eight bits at a time, and 16-bit command data in the data area following the address area is inputted twice, eight bits at a time. For a data latch (DLH) 32, its high-order eight bits (IB15-8) are inputted. For a data latch (DLL) 33, its low-order eight bits (IB7-0) are inputted. Output (IB15-0) of the data latches 32 and 33 is organized into 16 bits and connected in parallel to an input terminal of the command address register 10 and input of the command data register array 11.

The command data register array 11 includes an endian setting register (ESREG) 35 for holding an endian setting command as control data for controlling whether the parallel interface with the outside is to be used as a big endian or a little endian. When the command address register 10 holds command address information for selecting the endian setting register 35, the command address decoder 12 selects the endian setting register (ESREG) 35. When a first endian setting command is loaded into the selected endian setting register 35, a control signal TCREV is set to a logical value 1. When a second endian setting command is loaded into the selected endian setting register 35, the control signal TCREV is set to a logical value 0. The control signal TCREV is supplied to a switching circuit (CHG) 36. The switching circuit generates data fetch pulses (latch pulses) φLPH and φLPL of the data latches 32 and 33. The data latch 32 latches input data synchronously with a change in the high-order latch pulse φLPH. The data latch 33 latches input data synchronously with a change in the low-order latch pulse φLPL. When the control signal TCREV is the logical value 1, the switching circuit 36 changes the low-order latch pulse φLPL synchronously with a pulse change in a first transfer pulse φTPF changed synchronously with transfer of low-order byte data of 16-bit data. Likewise, the switching circuit 36 changes the high-order latch pulse φLPH synchronously with a pulse change in a second transfer pulse φTPS changed synchronously with transfer of high-order byte data of 16-bit data. On the other hand, when the control signal TCREV is the logical value 0, the switching circuit 36 changes the high-order latch pulse φLPH synchronously with a pulse change in the first transfer pulse φTPF changed synchronously with transfer of low-order byte data of 16-bit data. Likewise, the switching circuit 36 changes the low-order latch pulse φLPL synchronously with a pulse change in the second transfer pulse φTPS changed synchronously with transfer of high-order byte data of 16-bit data. A transfer counter (TCUNT) 37 counts cyclically counts 0 or 1 for each write cycle by a write signal in a state in which a chip is selected by the signal CS. At odd-numbered write cycles, the count value 0 is outputted. At even-numbered write cycles, the count value 1 is outputted. A decoder (DEC) 38 decodes the count value, and changes the first transfer pulse φTPF at odd-numbered write cycles and the first transfer pulse φTPF at even-numbered write cycles.

Figure 4:
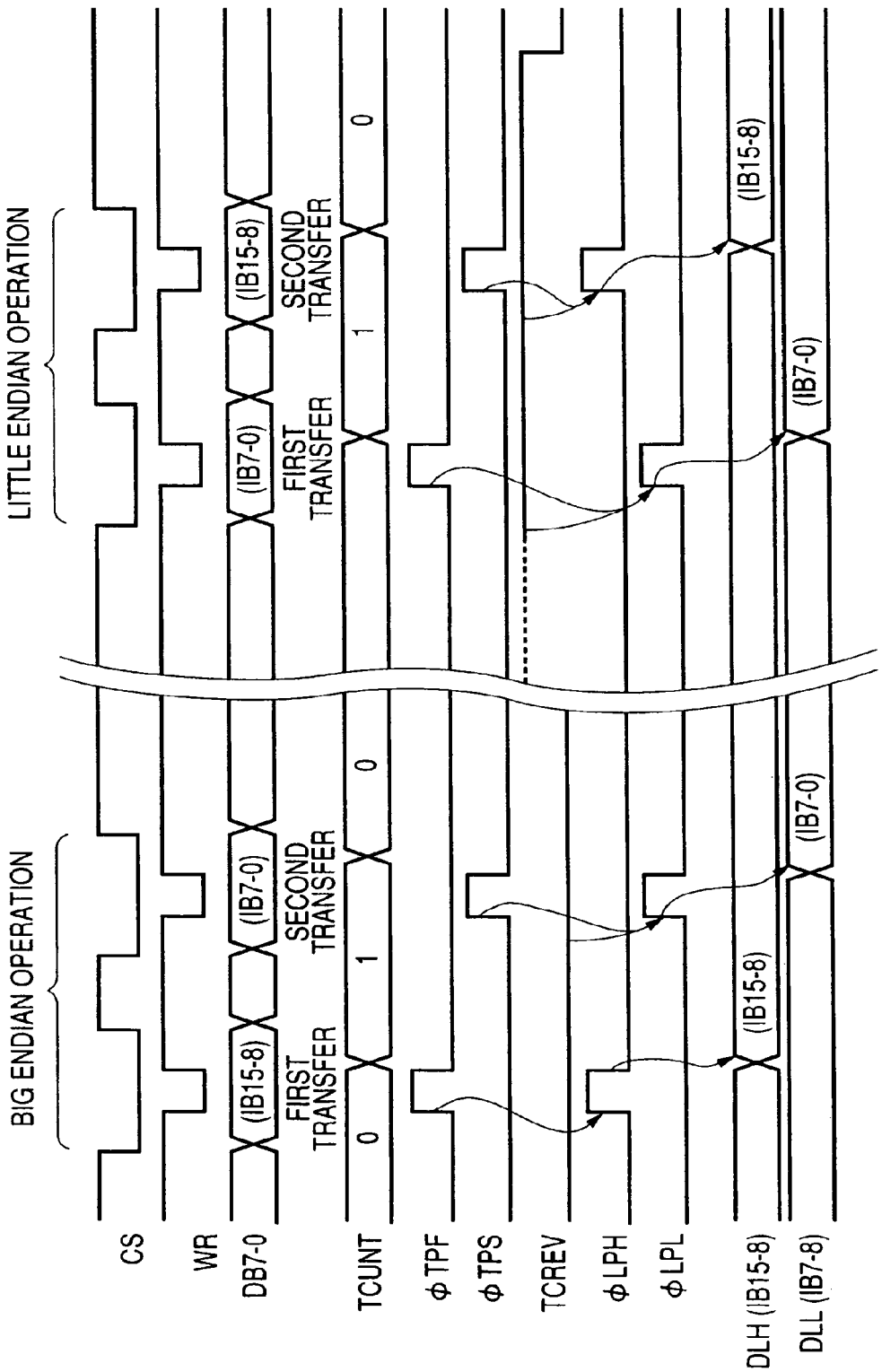
FIG. 4 is a timing diagram showing operation timing of an endian setting circuit of FIG. 1.

FIG. 4 shows operation timing of the endian setting circuit of FIG. 1. The switching circuit 36 regards the parallel interface as the little endian when the control signal TCREV is the logical value 1, and when the control signal TCREV is the logical value 0, regards the parallel interface as the big endian. FIG. 5 concisely shows an operation mode of the switching circuit 36.

Figure 7:
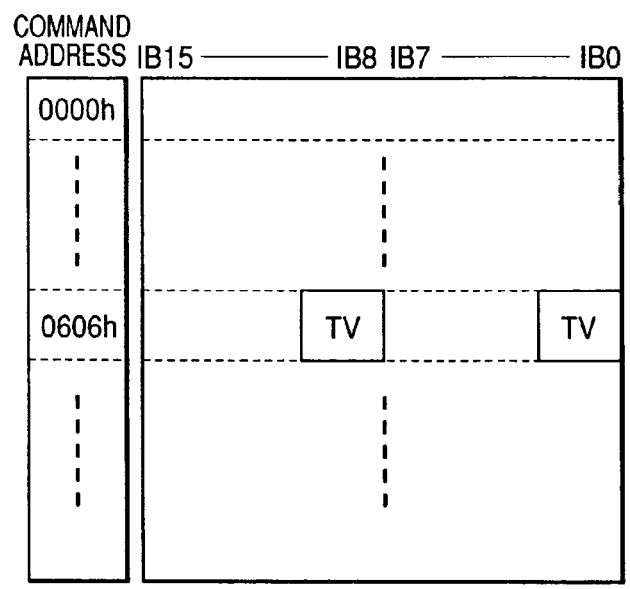
FIG. 7 is an address map of a command address register.

FIG. 6 shows command address information CMDAS for selecting the endian setting register 35, a first endian setting command CMDDL, and a second endian setting command CMDDB. The command address information is h0606. In short, as shown in FIG. 7 that shows an address map of the command data register, the endian setting register (ESREG) 35 is mapped at an address h0606. As shown in FIG. 6, the first endian setting command CMDDL is h0101. The second endian setting command CMDDB is h0000. In FIG. 6, a value TV in the positions of bit 0 (IB0) and bit 8 (IB8) is 1 for the first endian setting command CMDDL, and 0 for the second endian setting command CMDDB. The values of other bits IB1 to IB7, and IB9 to IB15 are 0. The above-described values h0606, h0101, and h0000 are examples of information with unchanged values in specific bit positions even if high-order and low-order bit positions are transposed. Therefore, when the host device 30 sets an endian immediately after the host device 30 releases the reset, if the host device 30 uses the little endian, it has only to issue the first endian setting command CMDDL along with the command address information CMDAS to the liquid crystal driving control device 1. If the host device 30 uses the big endian, it has only to issue the second endian setting command CMDDB along with the command address information CMDAS to the liquid crystal driving control device 1. Whatever the initial status of endian setting in the liquid crystal driving control device, the endian of the liquid crystal driving control device does not need to be recognized at all. This is because the values h0606, h0101, and h0000 are identical even if high-order and low-order bit positions are transposed.

The signal TCREV is a signal indicating a logical product of the value (TV) of the bit IB0 and the value (TV) of the bit IB1. It is verified by the signal TCREV that both the values of the bits IB0 and IB1 are 1 for the endian setting command CMDDL. A logic of verifying whether the value of each bit of the endian setting command is correct may be employed to generate the signal TCREV, but is not used here. The reasons follow. That is, the endian setting register (ESREG) 35 must be specified with a correct address h0606 supplied. An initial status by power-on reset is big endian setting (TCREV=0), and for a command for changing to little endian setting, IB0 and IB1 of the value h0101 can be correctly verified. As long as operations based on the command specifications of FIG. 6 are performed, normal endian control is guaranteed. For these reasons, for the logic of generating the signal TCREV, even if the values of bits IB1 to IB7, and IB9 to IB15 are not cared, and any one of IB0 and IB8 is 1 for resetting from the little endian to the big endian, there is no serious trouble. This remarkably simplifies the logic of determining the endian setting command.

<Cellular Phone>

Figure 8:
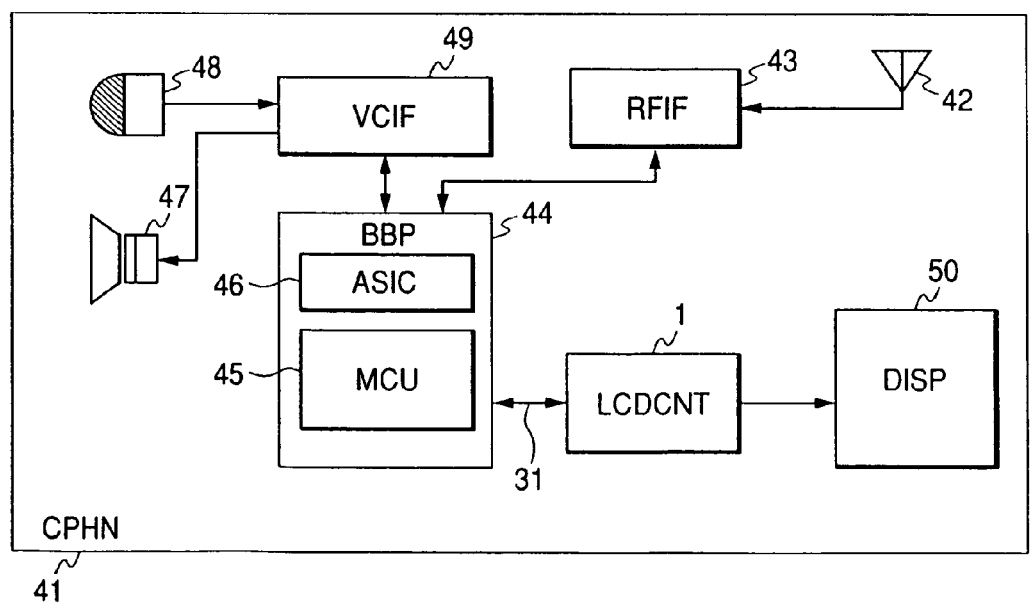
FIG. 8 is a block diagram of a cellular phone relating to a data processing system to which a liquid crystal driving control device is applied.

FIG. 8 shows a cellular phone (CPHN) 41 relating to a data processing system to which the liquid crystal driving control device 1 is applied. A receive signal of a radio band received by an antenna 42 is sent to a high-frequency interface part (RFIF) 43. The receive signal is converted into a signal of a low frequency, decoded, and converted into a digital signal by the high-frequency interface part 43, and supplied to a baseband part (BBP) 44. The baseband part 44 performs channel codec processing using a microcomputer (MCU) 45 and the like, releases the secrecy of the received digital signal, and performs error correction. The baseband part 44 uses an application specific semiconductor device (ASIC) 46 to perform division into control data necessary for communications and compressed voice data. The control data is sent to the MCU 45, which performs communication protocol processing. The voice data extracted in the channel codec processing is decompressed using the MCU 45, supplied to a voice interface circuit (VCIF) 49 as voice data, converted into an analog signal, and reproduced as voice by a loudspeaker 47. In the case of transmission operations, a voice signal inputted from a microphone 48 is converted into a digital signal in the voice interface circuit 49, subjected to filter processing using the MCU 45 and the like, and converted into compressed voice data. The ASIC 46 synthesizes the compressed voice data and the control data from the MCU 45 into a train of transmission data, and adds error correction and detection code and secret code to the train of transmission data by using the MCU 45 to produce transmission data. The transmission data is converted in the high-frequency interface part 43, and the converted transmission data is converted into a signal of a high frequency and sent out as a radio signal from the antenna 42.

The MCU 45 issues display commands and display data to the liquid crystal driving control device (LCDCNT) 1. In response, the liquid crystal driving control device (LCDCNT) 1 displays an image on a liquid crystal display 50. The MCU 45 includes circuit units such as a central processing unit (CPU) and a digital signal processing processor (DSP). The MCU 45 may be constructed separately to a baseband processor (BBP) exclusively responsible for baseband processing for communications, and an application processor (APP) exclusively responsible for extra function control such as display control and security control. The LCDCNT 1, ASIC 46, and MCU 45 are respectively constructed by specific semiconductor devices although there is no particular limitation. In this embodiment, the MCU 45 is used as a host device of the liquid crystal driving control device 1. As an interface between the MCU 45 and the liquid crystal driving control device 1, a parallel interface by the signal lines 321 is selected.

Figure 9:
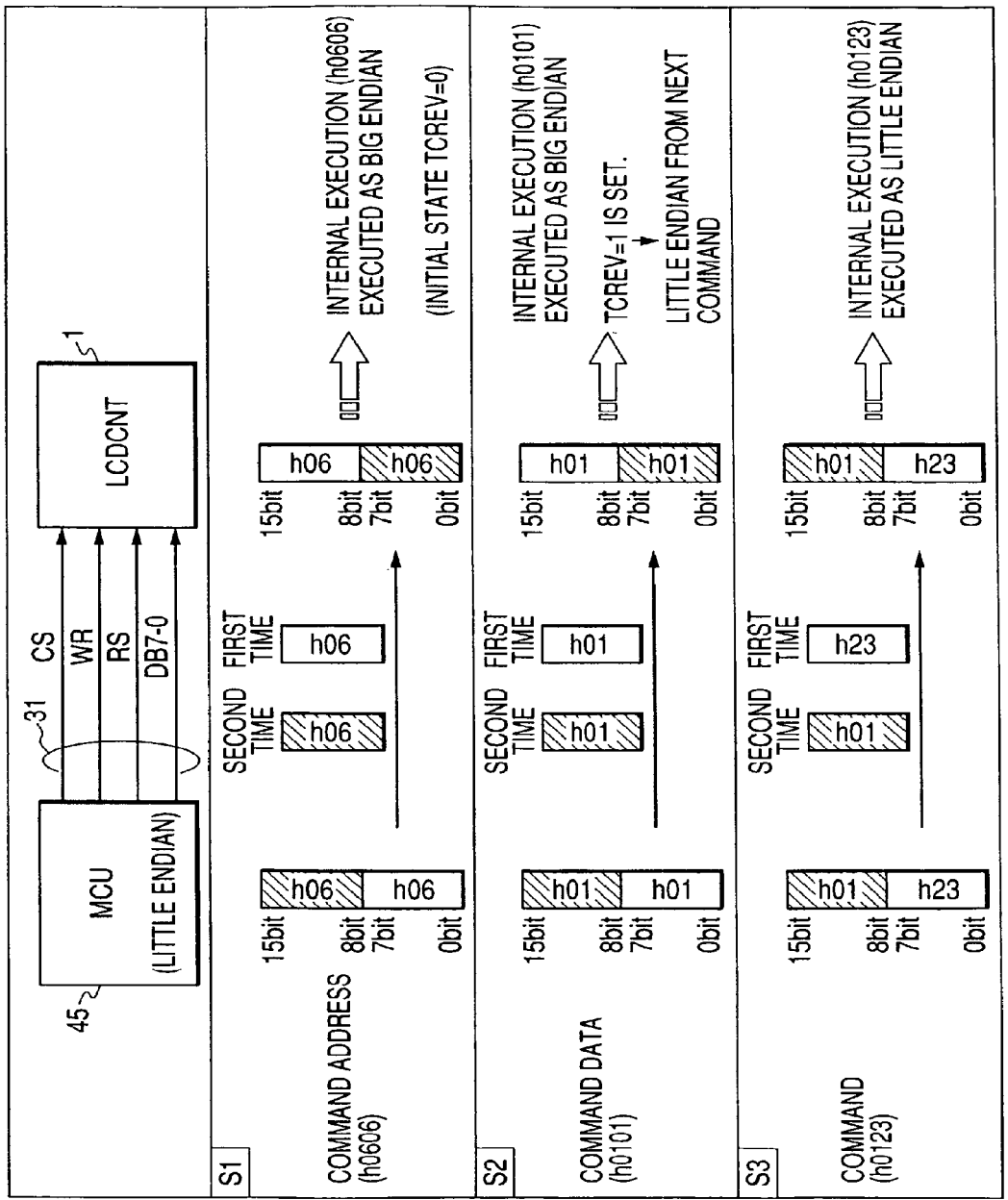
FIG. 9 is a drawing showing an example of endian setting operations by an MCU.

FIG. 9 shows an example of endian setting operations by the MCU 45. The MCU 45 functions as a transfer master that performs the parallel interface in a little endian mode. The liquid crystal driving control device 1 is initialized so that the parallel interface is performed in the little endian mode by a power-on reset.

The MCU 45 performs processings S1 and S2 immediately after the power-on reset is released. In processing S1, the MCU 45 issues a command address h0606. Although the endians of the MCU 45 and the LCDCNT 1 are different from each other, even if the high-order and low-order bit positions of the command address h0606 are transposed, since the value of the command address h0606 is the same, the endian setting command register 35 is normally selected. In processing S2, the MCU 45, to match the endian of the LCDCNT 1 to its own endian, issues a first endian setting command CMDDL of a value h0101 to specify the little endian. Although the endians of the MCU 45 and the LCDCNT 1 are still different from each other, even if the high-order and low-order bit positions of the command data h0101 are transposed, since the value of the command data h0101 is the same, the command data H0101 is normally set in the endian setting command register 35. Thereby, the endian of the LCDCNT 1 is changed from the big endian to the little endian. In processing S3 after that, since both the MCU 45 and the LCDCNT 1 operate in the little endian, any command addresses and any command data can be normally processed.

Although not shown, when the endian of the MCU 45 is the big endian, immediately after the power-on reset, the MCU 45 has only to issue the command address h0606 and a second endian setting command CMDDB of the value h0000.

Figure 10:
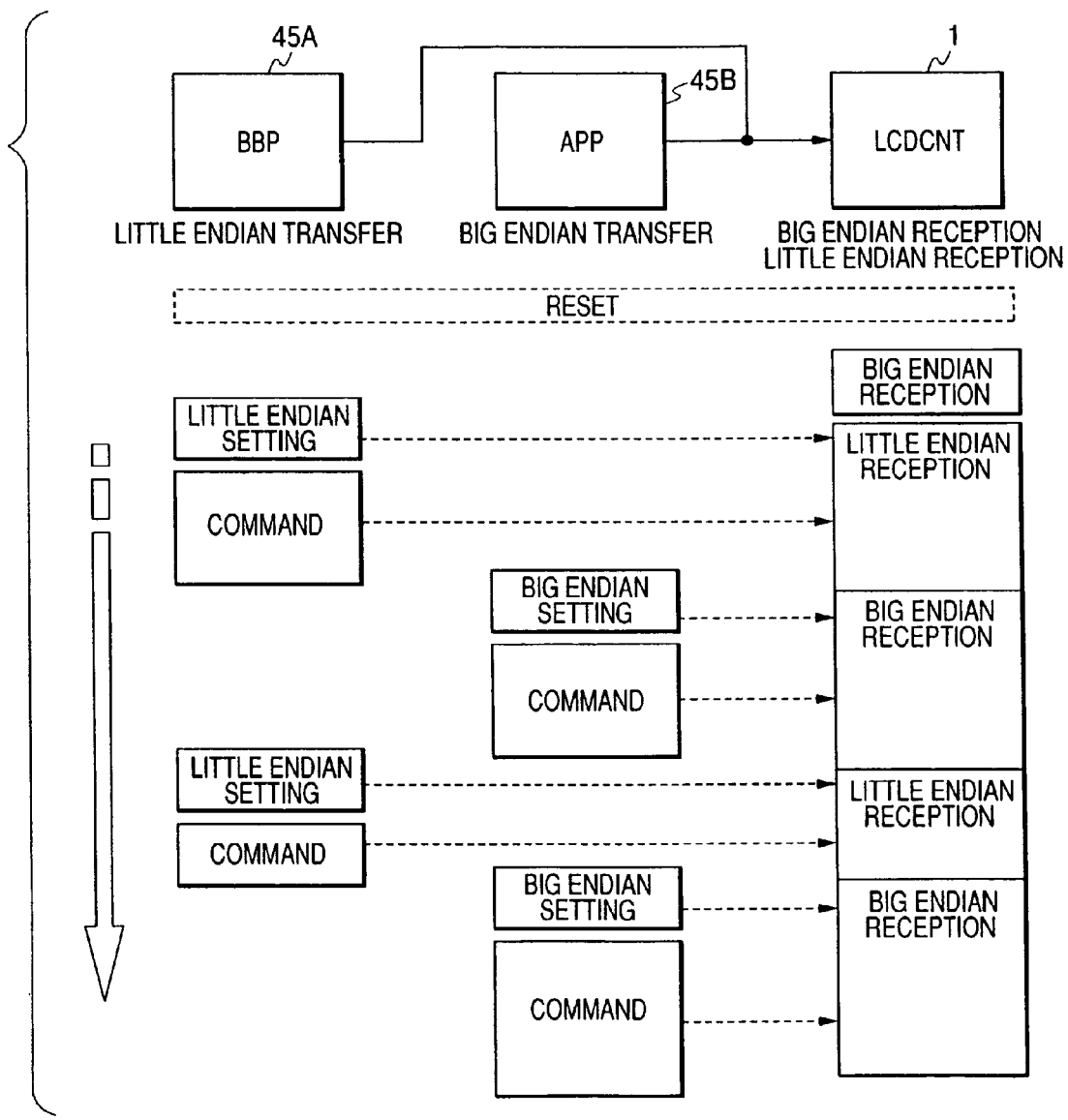
FIG. 10 is a drawing for explaining the operation of dynamically switching endian settings when both a baseband processor and an application processor control a liquid crystal driving control device.

FIG. 10 is a drawing for explaining the operation of dynamically switching endian settings when both a baseband processor (BBP) 45A and an application processor (APP) 45B control the liquid crystal driving control device (LCDCNT) 1 as host devices. The BBP 45A functions as a transfer master that performs the parallel interface in a little endian mode. The liquid crystal driving control device 1 is initialized so that the parallel interface is performed in the big endian mode by a power-on reset. As shown in FIG. 10, when the BBP 45A controls the LCDCNT 1, it uses an endian setting command so that the LCDCNT 1 can operate in the little endian mode. An example of this is the case where a clock is displayed on a liquid crystal display using a real time clock of the BBP 45AQ in a standby state of a cellular phone. When the APP 45B controls the LCDCNT 1, it uses an endian setting command so that the LCDCNT 1 can operate in the big endian mode. By the endian switching function of the LCDCNT 1, it is possible to dynamically switch endians.

Hereinbefore, though the invention made by the inventors of the present invention has been described in detail based on the preferred embodiments, it goes without saying that the present invention is not limited to the preferred embodiments, but may be modified in various ways without changing the main purports of the present invention.

For example, in this specification, commands denote not only instructions set in a command register, but also control data to be set in control registers such as a port control register. In short, in the case of a liquid crystal driving control device, data other than display data is commands, and denote instruction data that commands an operation in some sense. A construction which allows a serial interface to be selected as a host interface in one liquid crystal driving control device is not mandatory to the present invention. A host device is not limited to one MCU 45 used for baseband processing and application processing. The host device may be a baseband processor and/or an application processor, or may be other circuits.

Address information endian setting is not limited to h0606 Likewise, endian setting commands are not limited to h0000 and h0101. Even if high-order and low-order bit positions are transposed, there is no problem if the values of specific bit positions are unchanged. The values of high-order bits and low-order bits do not necessarily need to be identical with each other. The high-order bit positions or the low-order bit positions of data are not limited to be byte units. They may be word units or long word units.

The present invention, without being limited to cellular phones, can be widely applied to portable data processing terminals such as PDA (personal digital assistant), and various data processing systems such as storage terminals. Semiconductor devices or peripheral devices are not limited to liquid crystal driving control devices. The present invention can be applied to various circuits and devices such as graphic controllers, memory controllers, bus controllers, direct memory access controllers, and memories.

What is claimed is:

1. A semiconductor device including a processing unit and a plurality of data terminals, the processing unit comprising:
   an interface circuit configured to receive an endian setting command from the plurality of data terminals; and
   an endian setting register configured to store the endian setting command,
   wherein the interface circuit is configured to switch operation between a big endian mode and a little endian mode based on a value of the endian setting command stored in the endian setting register,
   wherein the endian setting command is comprised of a high-order bit portion and a low-order bit portion, and
   wherein the high-order bit portion and the low-order bit portion of the endian setting command are identical.

2. A semiconductor device according to claim 1, further comprising:
   a data bus configured to transfer the endian setting command from the interface circuit to the endian setting register, wherein the bit length of each of the high-order bit portion and the low-order bit portion of the endian setting command is a same as the width of the data bus.

3. A semiconductor device according to claim 2, further comprising:
a gate driver circuit and a source driver circuit configured to output display data to a liquid crystal display panel.

4. A semiconductor device including a processing unit and a plurality of data terminals, the processing unit comprising:
an interface circuit configured to receive an endian setting command and an endian setting address from the plurality of data terminals; and
an endian setting register corresponding to the endian setting address and configured to store the endian setting command,
wherein the interface circuit is configured to switch operation between a big endian mode and a little endian mode based on a value of the endian setting command stored in the endian setting register,
wherein each of the endian setting command and the endian setting address is comprised of a high-order bit portion and a low-order bit portion,
wherein the high-order bit portion and the low-order bit portion of the endian setting command are identical, and
wherein the high-order bit portion and the low-order bit portion of the endian setting address are identical.

5. A semiconductor device according to claim 4, further comprising:
a data bus configured to transfer the endian setting command from the interface circuit to the endian setting register,
wherein the bit length of each of the high-order bit portion and the low-order bit portion of the endian setting command is a same as the width of the data bus of the processing unit, and
wherein the bit length of each of the high-order bit portion and the low-order bit portion of the endian setting address is a same as the width of the data bus of the processing unit.

6. A semiconductor device according to claim 5, further comprising:
a gate driver circuit and a source driver circuit configured to output display data to a liquid crystal display panel.

7. A semiconductor device including a processing unit and a data input, the processing unit comprising:
an interface circuit configured to receive an endian setting command and an endian setting address from the data input; and
an endian setting register configured to store the endian setting command,
wherein the interface circuit is configured to switch operation between a big endian mode and a little endian mode based on a value of the endian setting command stored in the endian setting register,
wherein the endian setting command is comprised of a high-order bit portion and a low-order bit portion, and
wherein the high-order bit portion and the low-order bit portion of the endian setting command are identical.

8. A semiconductor device according to claim 7, further comprising:
a data bus configured to transfer the endian setting command from the interface circuit to the endian setting register,
wherein the bit length of each of the high-order bit portion and the low-order bit portion of the endian setting command is a same as the width of the data bus.

9. A semiconductor device according to claim 8, further comprising:
a gate driver circuit and a source driver circuit configured to output display data to a liquid crystal display panel.

10. A semiconductor device including a processing unit and a data input, the processing unit comprising:
an interface circuit configured to receive an endian setting command and an endian setting address from the data input; and
an endian setting register corresponding to the endian setting address and configured to store the endian setting command,
wherein the interface circuit is configured to switch operation between a big endian mode and a little endian mode based on a value of the endian setting command stored in the endian setting register,
wherein each of the endian setting command and the endian setting address is comprised of a high-order bit portion and a low-order bit portion,
wherein the high-order bit portion and the low-order bit portion of the endian setting command are identical, and
wherein the high-order bit portion and the low-order bit portion of the endian setting address are identical.

11. A semiconductor device according to claim 10, further comprising:
a data bus configured to transfer the endian setting command from the interface circuit to the endian setting register,
wherein the bit length of each of the high-order bit portion and the low-order bit portion of the endian setting command is a same as the width of the data bus, and
wherein the bit length of each of the high-order bit portion and the low-order bit portion of the endian setting address is a same as the width of the data bus of the display driver.

12. A semiconductor device according to claim 11, further comprising:
a gate driver circuit and a source driver circuit configured to output display data to a liquid crystal display panel.

* * * * *